(12) United States Patent
Koerner et al.

(10) Patent No.: US 7,486,189 B2
(45) Date of Patent: Feb. 3, 2009

(54) RFID SYSTEMS AND METHODS EMPLOYING INFRARED LOCALIZATION

(75) Inventors: Steve Koerner, Mesa, AZ (US); David Worthy, Gilbert, AZ (US)

(73) Assignee: RF Code, Inc, Austin, TX (US)

( * ) Notice: Subject to any disclaimer, the term of this patent is extended or adjusted under 35 U.S.C. 154(b) by 352 days.

(21) Appl. No.: 11/412,415

(22) Filed: Apr. 26, 2006

(65) Prior Publication Data

US 2006/0261951 A1 Nov. 23, 2006

Related U.S. Application Data

(60) Provisional application No. 60/675,280, filed on Apr. 26, 2005.

(51) Int. Cl.
*G08B 13/14* (2006.01)

(52) U.S. Cl. ...................... 340/572.1; 342/42

(58) Field of Classification Search .............. 340/572.1, 340/573.1, 10.1, 10.3, 825.49; 235/385; 342/42
See application file for complete search history.

(56) References Cited

U.S. PATENT DOCUMENTS

| | | |
|---|---|---|
| 3,054,100 A | 9/1962 | Jones |
| 3,270,338 A | 8/1966 | Watters |
| 3,293,642 A | 12/1966 | Gleles et al. |
| 3,377,616 A | 4/1968 | Auer |
| 3,439,320 A | 4/1969 | Ward |
| 3,568,161 A | 3/1971 | Knicket |
| 3,633,158 A | 1/1972 | Heibel |
| 3,644,883 A | 2/1972 | Borman et al. |
| 3,646,580 A | 2/1972 | Fuller |
| 3,696,384 A | 10/1972 | Lester |

(Continued)

FOREIGN PATENT DOCUMENTS

| | | |
|---|---|---|
| EP | 1 102 084 A2 | 5/2001 |
| EP | 1 505 465 A1 | 2/2005 |

OTHER PUBLICATIONS

Halit Eren et al. "Accuracy in Position Estimation of Mobile Robots Based on Coded Infrared Signal Transmission," 1995 IEEE Instrumentation and Measurement Technology Conference. IMTC/95. Waltham, MA., Apr. 23-26, 1995, Proceedings of the Instrumentation and Measurement Technology Conference. (IMTC), New York, IEEE, US, Apr. 23, 1995, pp. 548-551.

*Primary Examiner*—John A Tweel, Jr.

(57) ABSTRACT

A series of radio frequency identification (RFID) systems are delineated. One such RFID system comprises an RFID signpost, and a plurality of infrared transmitters, wherein each infrared transmitter of the plurality of infrared transmitters is arranged to cover, when transmitting, a distinct sector relative to the RFID signpost. Another RFID system comprises an RFID signpost having a transmitter for transmitting signals of a predefined type, and a receiver for receiving signals of the predefined type, wherein the transmitter for transmitting signals of the predefined type cannot transmit until a determination is made that the predefined type of signal is not present at the receiver. Still another RFID system comprises an RFID signpost including a transmitter having a continuous power dissipation rating, and a processor for controlling the transmitter such that peak pulse power of a transmission from the transmitter multiplied by its duty cycle does not exceed the continuous power dissipation rating for the transmitter.

6 Claims, 6 Drawing Sheets

U.S. PATENT DOCUMENTS

| | | | |
|---|---|---|---|
| 3,697,941 A | 10/1972 | Christ | |
| 3,718,899 A | 2/1973 | Rollins | |
| 3,757,290 A | 9/1973 | Ross et al. | |
| 3,805,265 A | 4/1974 | Lester | |
| 3,984,807 A | 10/1976 | Haemmig | |
| 4,107,689 A | 8/1978 | Jellinek | |
| 4,112,421 A | 9/1978 | Freeny, Jr. | |
| 4,209,787 A | 6/1980 | Freeny, Jr. | |
| 4,274,083 A | 6/1981 | Temoeda | |
| 4,275,385 A | 6/1981 | White | |
| 4,350,970 A | 9/1982 | Tomkewitsch | |
| 4,398,172 A | 8/1983 | Carroll | |
| 4,601,064 A | 7/1986 | Shipley | |
| 4,649,385 A | 3/1987 | Aries et al. | |
| 4,691,202 A | 9/1987 | Denne | |
| 4,831,539 A | 5/1989 | Hagenbuch | |
| 4,837,568 A | 6/1989 | Snaper | |
| 4,870,419 A | 9/1989 | Baldwin et al. | |
| 4,906,853 A | 3/1990 | Linwood et al. | |
| 4,937,581 A | 6/1990 | Baldwin et al. | |
| 4,977,619 A | 12/1990 | Crimmins | |
| 4,990,892 A | 2/1991 | Guest | |
| 5,062,151 A | 10/1991 | Shipley | |
| 5,103,108 A | 4/1992 | Crimmins | |
| 5,132,687 A | 7/1992 | Baldwin | |
| 5,153,584 A | 10/1992 | Engira | |
| 5,239,296 A | 8/1993 | Jenkins | |
| 5,268,734 A | 12/1993 | Parker et al. | |
| 5,276,496 A | 1/1994 | Heller et al. | |
| 5,317,309 A | 5/1994 | Vercellotti et al. | |
| 5,349,332 A | 9/1994 | Ferguson et al. | |
| 5,355,222 A | 10/1994 | Heller et al. | |
| 5,382,784 A | 1/1995 | Eberhardt | |
| 5,387,993 A | 2/1995 | Heller et al. | |
| 5,479,408 A | 12/1995 | Will | |
| 5,528,232 A | 6/1996 | Verma et al. | |
| 5,572,195 A | 11/1996 | Heller et al. | |
| 5,627,517 A | 5/1997 | Theimer et al. | |
| 5,627,524 A | 5/1997 | Fredrickson et al. | |
| 5,631,642 A | 5/1997 | Brockelsky | |
| 5,708,423 A | 1/1998 | Ghaffari et al. | |
| 5,825,045 A | 10/1998 | Koenck et al. | |
| 5,917,425 A | 6/1999 | Crimmins et al. | |
| 5,977,913 A * | 11/1999 | Christ | 342/465 |
| 6,104,295 A * | 8/2000 | Gaisser et al. | 340/573.4 |
| 6,104,311 A | 8/2000 | Lastinger | |
| 6,150,948 A | 11/2000 | Watkins | |
| 6,154,139 A | 11/2000 | Heller | |
| 6,175,308 B1 | 1/2001 | Tallman et al. | |
| 6,211,781 B1 | 4/2001 | McDonald | |
| 6,340,932 B1 | 1/2002 | Rodgers et al. | |
| 6,351,215 B2 | 2/2002 | Rodgers et al. | |
| 6,362,737 B1 | 3/2002 | Rodgers et al. | |
| 6,542,114 B1 | 4/2003 | Eagleson et al. | |
| 6,552,661 B1 | 4/2003 | Lastinger et al. | |
| 6,563,417 B1 | 5/2003 | Shaw | |
| 6,608,551 B1 | 8/2003 | Anderson et al. | |
| 6,611,556 B1 * | 8/2003 | Koerner et al. | 340/572.1 |
| 6,621,410 B1 | 9/2003 | Lastinger et al. | |
| 6,624,752 B2 | 9/2003 | Klitsgaard et al. | |
| 6,662,068 B1 | 12/2003 | Ghaffari | |
| 6,700,493 B1 | 3/2004 | Robinson | |
| 6,720,888 B2 | 4/2004 | Eagleson et al. | |
| 6,765,484 B2 | 7/2004 | Eagleson et al. | |
| 6,804,578 B1 | 10/2004 | Ghaffari | |
| 6,831,562 B2 | 12/2004 | Rodgers et al. | |
| 6,838,992 B2 * | 1/2005 | Tenarvitz | 340/573.1 |
| 6,982,646 B2 | 1/2006 | Rodgers et al. | |
| 7,042,358 B2 * | 5/2006 | Moore | 340/572.1 |
| 7,116,230 B2 * | 10/2006 | Klowak | 340/572.1 |
| 7,180,420 B2 * | 2/2007 | Maurer | 340/572.1 |
| 2006/0261959 A1 * | 11/2006 | Worthy et al. | 340/572.8 |
| 2008/0061962 A1 * | 3/2008 | Campman | 340/572.1 |

* cited by examiner

Figure 1, Global System Block Diagram

Figure 2, Local System Block Diagram

Figure 3, Signpost Block Diagram

RFID SYSTEMS AND METHODS EMPLOYING INFRARED LOCALIZATION

CROSS REFERENCE TO RELATED APPLICATION

This application is related to and claims priority from U.S. Appl. No. 60/675,280, filed Apr. 26, 2005, in the name of Koerner, et al. and entitled "Radio Frequency Identification Device System with Infrared Localization," the full content of which is incorporated by reference.

FIELD OF THE INVENTION

The present invention relates to radio frequency identification (RFID) systems and methods, and more particularly, to RFID systems and methods employing infrared (IR) localization.

BACKGROUND OF THE INVENTION

RFID is an automatic identification method, relying on storing and remotely retrieving data using devices called RFID tags, tags or transponders. An RFID tag is typically a small object that can be attached to or incorporated into an object, animal, or person. RFID tags may contain silicon chips and antennas to enable them to receive and respond to radio-frequency queries from an RFID transceiver. Passive tags require no internal power source, whereas active tags require a power source.

Active tags can periodically transmit their identification (ID) code, status, data and other information for as long as 10 years on a single battery. Active tags are capable of communicating with devices, such as a reader, at ranges of several hundred feet. Readers are capable of nearly simultaneous detection and reading of hundreds or thousands of tags.

In many RFID systems today, there is a need for localization, i.e., the ability to accurately determine the location of tagged objects, persons or animals to be within a region of desired dimensions. In a hospital setting, for example, it may be useful to know that a particular item of medical equipment or a particular person is somewhere within a relatively large area, e.g., 300 feet in any direction from a receiver or a reader. However, it may be useful to know more precisely where a particular asset, patient or employee is located, and perhaps whether the asset, patient or employee is safe and secure. This may be found from the determined location of the asset, patient or employee; the sensor inputs on the related tag or badge; and/or from a local signpost, that might indicate, for example, that a door is not secure, or smoke has been detected.

Similarly, in a mail or package processing center, for example, it may be useful to know where a specific container is located within a facility, particularly its precise location with respect to key access points, such as the front of a conveyor belt portal or a door. In this way, the system can more effectively route mail or packages in a container to the correct destination. In addition, with improved localization of tracked items down to a particular access point, such as a door, a tag may be turned off (to conserve power) before the related container is loaded on its transport and then turned on upon arrival at a specified destination access point.

Some RFID systems employ radio frequency (RF) signals. Radio frequency signals readily pass through walls, ceilings, floors, etc., however, RF signals also reflect and refract from various objects in the radio transmission path. Therefore, attempting to identify tag location based on RF signal strength has been generally ineffective. Usable RFID localization systems based upon RF signal time-of-flight have been developed and deployed, however, these systems are complex, expensive, and often of limited performance, particularly indoors, because of reflections and other problems.

Other RFID systems employ IR signals, particularly in an IR signpost, and generally provide relatively better and more precise localization. However, existing RFID systems employing IR signals have limited localization capabilities. There is also a need in existing RFID systems employing IR signals to provide system status and other information that, in turn, can greatly enhance asset utilization, productivity and security. There is also a need in existing RFID systems employing IR signals to provide for global interconnection and control of RFID systems where overall control and processing capability may be provided remotely, such as via an Internet website. Moreover, existing RFID systems employing IR signals generally have rigid hardware designs that cannot be adapted for use on multiple applications under programmable processor and system control.

Thus, a need exists for RFID systems employing IR signals that overcome these and other problems.

SUMMARY OF THE INVENTION

In accordance with one embodiment of the invention, an RFID system comprises an RFID signpost, and a plurality of infrared transmitters, wherein each infrared transmitter of the plurality of infrared transmitters is arranged to cover, when transmitting, a distinct sector relative to the RFID signpost.

In accordance with another embodiment of the invention, an RFID system comprises an RFID signpost having a transmitter for transmitting signals of a predefined type, and a receiver for receiving signals of the predefined type, wherein the transmitter for transmitting signals of the predefined type cannot transmit until a determination is made that the predefined type of signal is not present at the receiver.

In accordance with another embodiment of the invention, an RFID system comprises an RFID signpost including a transmitter having a continuous power dissipation rating, and a processor for controlling the transmitter such that peak pulse power of a transmission from the transmitter multiplied by its duty cycle does not exceed the continuous power dissipation rating for the transmitter.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

The appended drawings are exemplary and depict aspects of the disclosed embodiments of the present invention. Accordingly, specific systems or applications may have numerous signposts, tags, receivers, and/or other system components, and may have one local system controller, multiple controllers, or operate with or without a network or cable to connect to the signposts, between signposts and/or a global controller or website. In addition, not all capabilities or functionality must be used in one system or application.

DESCRIPTION OF THE EMBODIMENTS

Figure 1:
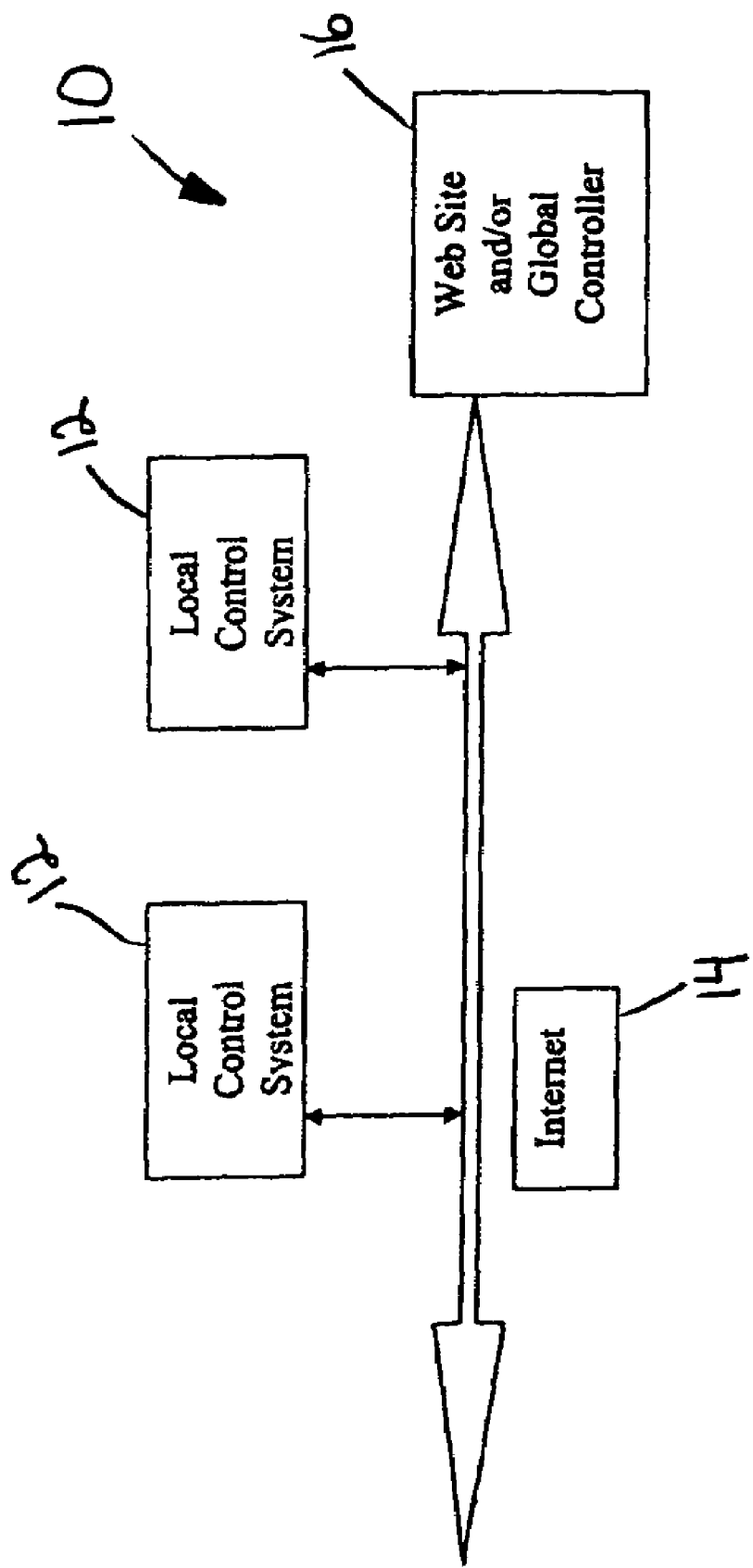
FIG. 1 is a block diagram of a plurality of exemplary local control systems coupled via the Internet to global or overall processing provided by a website or a remote global controller and/or processor, in accordance with systems and methods consistent with the present invention.

There is a need for improved IR methods of signal generation as well as IR and RF communication formats. Such improved methods and formats may (1) minimize or prevent collisions between signpost or tag signals, (2) enhance data acquisition to include audio, video and image data, (3) improve localization, (4) provide for the capability to operate a system locally and/or globally over the Internet, by WI-FI, over telephone lines, cables or other means, (5) determine location or position from multiple signposts, (6) utilize signposts having multiple transmitter outputs and signal diversity for improved performance.

One aspect of the present invention may include a monitoring system that can operate in an open-loop or one-way fashion, with location, status, data, programs, controls, instructions, or other communication between a signpost to a tag, from the tag to a receiver, and/or from the receiver to a system controller.

Another aspect of the present invention may include a monitoring system that can operate in a closed-loop or two-way fashion, with communication between a system controller to a signpost, from the signpost to the tag, from the tag to a receiver, and/or from the receiver to the controller.

Yet another aspect of the present invention may include a monitoring system that can interface, communicate and operate with the Internet, and/or remote controllers using WI-FI (Wireless Fidelity), Bluetooth, cellular telephone networks, telephone lines, cables, radio or other means, and operate locally, globally or both.

Still another aspect of the present invention may include a monitoring system that can communicate and operate with portable terminals, PDAs or computers, using IR, RF or other means, or a combination thereof to operate with a signpost, a tag, a receiver and/or a system controller.

Yet another aspect of the present invention may include a monitoring system with a signpost that can transmit an IR signal to a tag, and in addition, receive inputs from sensors and control devices, provide outputs to indicators and control devices, and/or provide RF, IR or cable communication with a system controller.

Still another aspect of the present invention may include a monitoring system having tags that can receive IR signpost signal inputs; receive inputs from sensors, such as motion sensors, tamper controls, and other inputs; provide outputs to controls, indicators, and other devices; and transmit RF signals to receivers.

Yet another aspect of the present invention may include a monitoring system that can determine a tag's location to be within a desired area or zone, such as a defined location, e.g., in a particular hospital bed, at a particular access point, etc.

Still another aspect of the present invention may include a monitoring system that has communication formats with significant data-acquisition, audio and video handling capability, and can receive, control, manage and process tag ID, control, status and/or other significant data received from numerous tags and signposts.

Yet another aspect of the present invention may include a monitoring system that can receive, encode, store, process and transmit encrypted data or other coded information, and provide data and control inputs and outputs to provide security for the system, and other objects, persons or vehicles.

Still another aspect of the present invention may include a monitoring system that can provide communication from a signpost to a tag or from a tag to a receiver, in a dual-mode asynchronous or synchronous fashion, using special communication formats designed to minimize or prevent collisions with other signposts or tags.

Yet another aspect of the present invention may include a monitoring system that can operate with software that determines tag location using tag signal inputs activated by multiple signposts, and/or from signposts that have the ability to locate tags within a portion of a signpost area, using communication path diversity.

Still another aspect of the present invention may include a monitoring system that can operate independently or globally as part of an overall asset or supply-chain control and management system, operating in accordance with Uniform Code Council (UCC), Electronic Product Code (EPC), International Standards Organization (ISO), International Electrotechnical Commission (IEC), WI-FI or other standards, and/or with overall system control on a website.

Yet another aspect of the present invention may include using simplified and low-cost commodity IR receiver integrated circuits (ICs), devices or modules in a tag, such as those used to control TVs, tape decks, DVD players etc., as well as custom sensor and receiver designs.

Still another aspect of the present invention may include using one or more IR transmit diodes excited in short pulses to achieve high optical power levels to flood a particular room or area with sufficiently diffuse illumination, so a tag can receive IR data signals in multiple orientations and positions within the room.

Yet another aspect of the present invention may include using high IR transmit levels such that the optical signal can penetrate portions of the human body, such as a hand, and textile and other items, such as sheets and blankets, in order to monitor, for example, a patient in a bed, and overcome background sun or other light.

Still another aspect of the present invention may include using IR data encoding having a low number, length, and duty cycle pulse-position modulation method or format so that the transmit IR LEDs may be operated at high-peak current levels, but low-average power levels, in order to achieve strong illumination levels.

Yet another aspect of the present invention may include varying, under program control, the amplitude of IR signals in order to vary the range, and to decrease the signal level to reduce the amount of IR diffusion to make the system operate more line-of-sight, for certain uses and applications.

Still another aspect of the present invention may include outputting a pattern or scanned pattern of IR transmission, such as a rotating IR beam, and/or varying the IR amplitude and/or receiver directionality or sensitivity, in order to more precisely locate a tag within a defined area or zone.

Yet another aspect of the present invention may include providing cyclical or synchronous IR signpost data transmission resulting in low RF transmission density to minimize tag collisions and to minimize or avoid the necessity of expensive tag auxiliary activation devices, such as a motion sensor.

Still another aspect of the present invention may include providing cyclic sampling of the IR receiver module or device, at low-duty cycles, in order to achieve a fast-reaction time when exposed to new IR signpost transmitters, and to conserve battery power.

Yet another aspect of the present invention may include providing a tag that can recognize the circumstance of a continued report from the same location, and avoid the need for higher current consumption associated with a longer or full IR read cycle, except under specifically defined circumstances.

Still another aspect of the present invention may include providing a tag with a memory that can report a current or historical signpost location code, as indicated by a status bit transmission, in order to insure that each valid code is transmitted multiple times, to insure system reception when the tag is moving at high speeds.

Yet another aspect of the present invention may include providing an IR signpost unit that can incorporate an IR sensor that is capable of detecting transmissions from a handheld IR terminal or controller, and to stop the IR signpost transmissions to allow the terminal to complete its communication between transmissions.

Still another aspect of the present invention may include providing an IR signpost unit that can incorporate, internally or externally, an IR sensor to detect the activation of a TV or other IR transducer or transmitter, in order to turn off the system IR transmissions for a period, allowing operation of the transducer without interference.

Still another aspect of the present invention may include providing communication formats that can be used for data acquisition and transport, including video or images, with a planned upward path for adding capabilities while maintaining standards, so that system software will not have to change for existing capabilities.

Yet another aspect of the present invention may include using IR, visual light, laser light, or acoustics, individually, or in some combination, for transmission from a signpost to a tag, as a means of providing a broad and diffused tag localization, or narrower, more focused, discrete or more line-of-sight tag localization, or both.

Still another aspect of the present invention may include providing small battery operated signposts that can operate in an array, such as in-line, column and row, star or other pattern, where signposts communicate with each other and/or a central controller, using low-power IR and/or radio means, creating a form of Pico network.

Yet another aspect of the present invention may include providing a tag that can be located, in a contiguous fashion in single, multiple linear or angular directions, by the use of sum and difference ratio-metric means to measure received tag signal levels, or by transmitting different transmit levels with fixed tag thresholds.

Still another aspect of the present invention may include providing a tag that, in contrast to some other systems, can transmit the high-rate manual or alarm initiated transmissions at the same lower or higher power level as the low-rate self initiated or "beacon" transmission, using the low-density sparse communication format that is employed.

Yet another aspect of the present invention may include providing a tag, that when activated by human intervention, such as when initiated by a panic, motion, emergency, security or other critical input, transmits information at a high rate and at higher power levels than a normal beacon signal, including sending prior signpost information.

Still another aspect of the present invention may include providing a signpost that can transmit omni-directional IR signals, fan patterns, or other patterns in order to provide targeted location coverage areas within a room, such as locating patients in a hospital room and matching them with their respective beds.

Yet another aspect of the present invention may include providing a signpost that can transmit or receive IR, RF or acoustics, or two or more thereof, or a tag that can receive or transmit IR, RF or acoustics or two or more thereof, as a means of providing range information by comparing the time-of-flight of each signal.

Still another aspect of the present invention may include providing a signpost that can be movable, such as located on a vehicle that can operate with tags on the vehicle, and/or fixed position tags that can serve as locating and long-range transmission elements for the signpost, thereby reversing the roles of the signpost and tags.

Yet another aspect of the present invention may include providing a tag that receives a signpost signal, and in order to prevent multiple tags from being synchronized by a signpost and then transmitting at the same time, transmits a signpost-initiated signal at the next tag-determined time that it normally sends a self-initiated transmission.

Still another aspect of the present invention may include providing a tag that varies its normal self-initiated or beacon signal at times that vary based on their identification code, so that even if they transmit at the same time once, in subsequent transmissions, their transmit times will vary, thereby preventing signal collisions.

Still another aspect of the present invention may include providing a monitoring and tracking system that is modularized, so that much of the above-identified functionality and capability can be selectively included, the system size can be scaled, and it can operate locally or globally, or both, based on the needs of a specific application.

Reference will now be made in detail to the present exemplary embodiments of the invention, examples of which are illustrated in the accompanying drawings. Wherever possible, the same reference numbers will be used throughout the drawings to refer to the same or like parts.

As shown in FIG. 1, a global control system 10 may include one or more local control systems 12, a long-distance or global communication system 14, such as the Internet, and a website 16, or other remote or global controller 16. An exemplary embodiment is described using IR and radio wireless communication, as well as signposts that can communicate with each other and/or the system controller.

Figure 2:
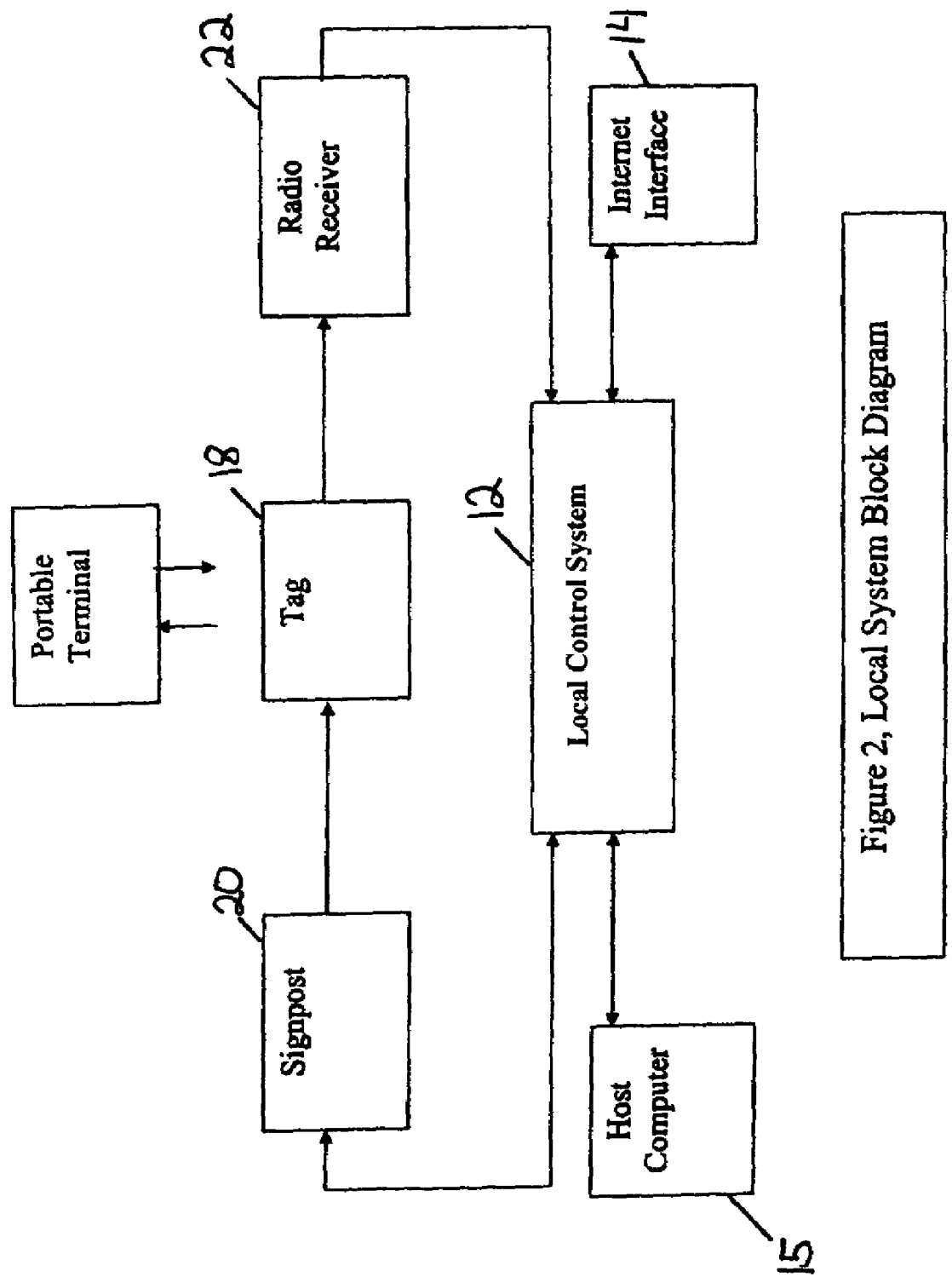
FIG. 2 is a block diagram of an RFID system including an exemplary signpost, tag, receiver, system controller, LAN network, and a portable or handheld terminal, in accordance with systems and methods consistent with the present invention.

Referring to FIG. 2, the local control system (or controller) 12, in operation with a processor or computer, serves the purpose of receiving tag signals, and for tags 18 within proximity or range of a signpost 20, receives the signpost address or coordinates, status, and associated data combined with the tag identification (ID), status and associated data. In this manner, the local control system 12 can determine the presence of the tags 18 within the larger range of one or more receivers 22, and their local location by receipt of the signpost address, along with its associated data.

The local controller system 12 can operate over the Internet 14 in communication with a remote website, global controller or overall monitoring system 16, which can operate worldwide in concert with one or many local controller systems 12. A website can process received tag, signpost, sensor and other data and inputs, in accordance with system software that emulates the system processes and methods, or a portion thereof, normally provided in a local controller 12, or those that may be performed in a global or overall system controller 16, or both, as well as provide a central database of inventory, status, itinerary, transactions, and other data.

In a minimum open-loop system configuration or embodiment, employing independent signposts 20 without the direct bi-directional communication with the central controller 12, as shown, the system sends inputs from the signpost 20 to the tag 18, then from the tag 18 to one or more receivers 22, and then to the controller system 12, creating a one-way system.

If desired, a pilot, reference, test or check tag can be permanently mounted internally or in proximity or range of a signpost 20 in order to allow the signpost 20 to communicate with the system controller 12 in a manner that allows signpost sensor or other data transmissions, and tests the signpost, receiver and system controller operation in the absence of a movable tag 18.

In an enhanced or closed-loop configuration, the signposts 20 are connected with the central controller 12, as shown, with cable, LANS, Internet, IR, WI-FI, radio or other forms of direct communication, and the system can send outputs from the signpost 20 to one or more tags 18, then from the tags 18 to one or more receivers 22, and then to the controller system 12, and from the controller 12 to the signposts 20, creating a two-way system.

This allows the system controller 12 to send instructions, controls and input to the signposts 20 and/or tags 18, such as instructions to activate a signpost output, such as locking a door, sending to a tag 18 status or other data updates to change the tags mode of operation, or sending communication synchronization and timing information to a signpost 20 and/or tag 18, in order to minimize or prevent collisions of signpost and/or tag signals.

A system controller 12, or a signpost 20, operating independently, can reset or set the time of a tag operation, and in this manner, tags 18 in proximity of a signpost 20, and for some time afterwards, can operate at absolute times in order to synchronize tag reception and transmission. For example, a tag 18 on a package container or a package in a mail-processing center, normally operating asynchronously, upon entry to a travel chokepoint, can be synchronized in time, and its RF transmission time can be assigned to occur at times that do not collide with those assigned to other tags 18 or tags 18 activated by other signposts 20. For containers or people that enter or exit daily or otherwise in a repeatable manner, the time synchronization can then be maintained over a period or even continuously, being updated often.

More specifically, various aspects of the invention seek to employ low-cost hardware components that are able to achieve fast, near real-time, responsiveness as tagged assets and personnel are moving about within a building or outside. Further, it is desirable to accomplish this at low current consumption, to preserve long tag or signpost operating life, using small low-cost commodity batteries or the like.

Figure 3:
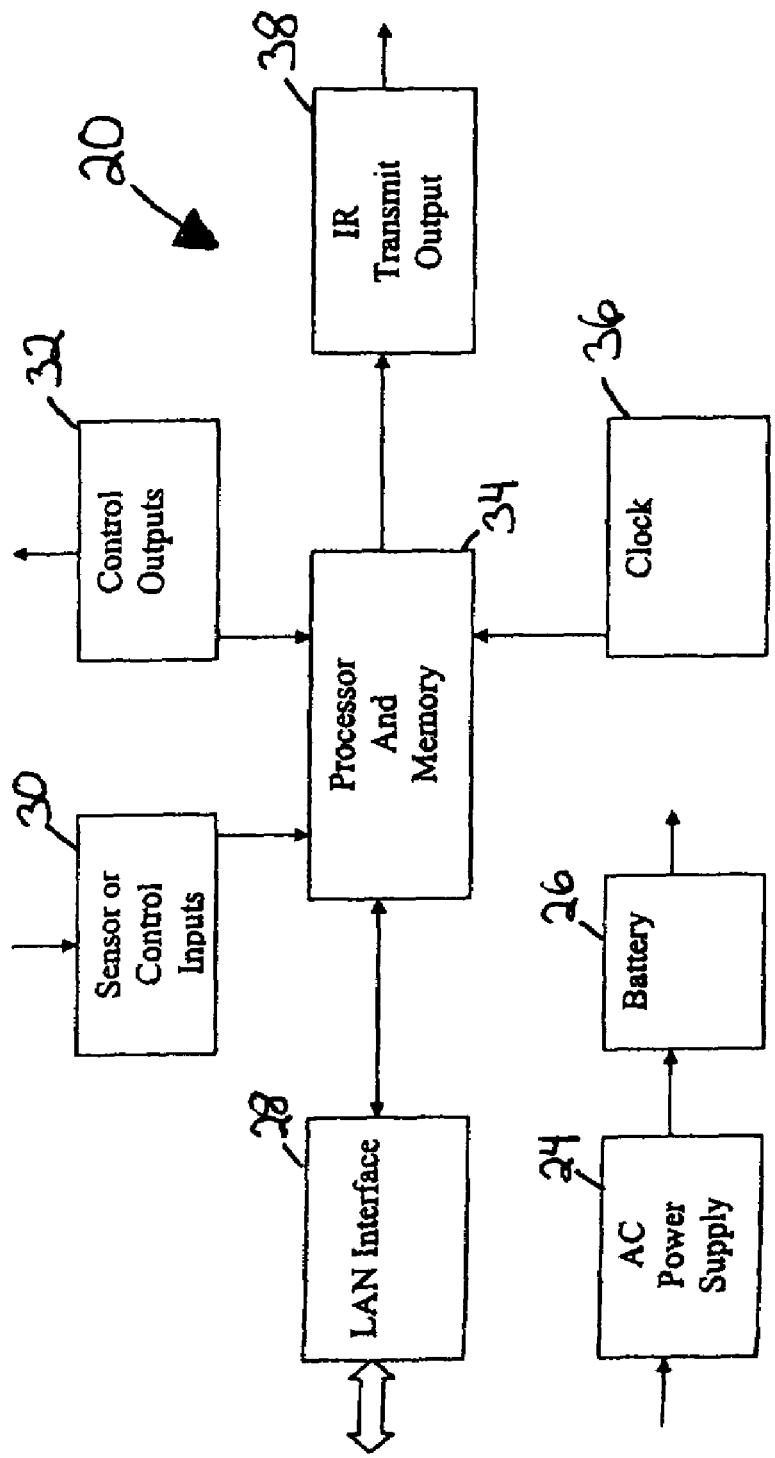
FIG. 3 is a block diagram of an exemplary signpost including an AC power supply or charger, a battery, wired or wireless LAN interface, sensor or control inputs, control outputs, a controller having a processor with memory, a clock, and an IR transmitter output, in accordance with systems and methods consistent with the present invention.

A signpost 20, as shown in FIG. 3, may include an AC power supply or a charger 24, a battery 26, wired or wireless LAN interface 28, sensor or control inputs 30, control outputs 32, a controller 34 having a processor with memory, a clock 36, and an IR transmitter output 38.

The primary purpose of the signpost 20 is to locate the tag 18 to a local area, or to a portion of the local area, in a very economical and simple fashion. This may be done by sending, using IR transmission, identification, status, sensor, control, programming and other data and associated information, within a local area from the signpost 20 to a tag 18 or multiple tags 18. In turn, the tag 18 operates in accordance with preset or received control instructions, to transmit a high-frequency radio output with selected identification, data, control and status information, along with received local signpost information, to a long-range high-frequency RF or radio receiver 22.

As an example, a signpost 20 is located in manner to transmit to a tag 18 at a slow beacon rate its identification, verifying the signpost presence and nearby location. The tag 18 is tracked by a receiver 22 within distances of hundreds of feet, however, when the tag 18 moves through a designated doorway or key access point, the tag 18 comes into close proximity of a signpost 20 that, in turn, causes the tag 18 to transmit at a higher rate both its own identification and information pertaining to the specific signpost 20. The reception of the tag RF signal by a receiver 22 or receivers 22, with local location information, then tells the system controller 12 and/or the associated computer system 15 where the tag 18 is within a proximity area, or a portion of the proximity area.

Signposts 20 are generally inexpensive, but provide valuable localization information by their signpost identification, and can instruct the tag 18 to perform multiple functions including turn on, turn off, operate at a low, medium or high rate, operate for a specific period of time and then turn off, synchronize the tag operation, or operate in any other mode. In this manner, the tag 18 can operate at very low power rates or can be completely off until information is needed, such as when passing through a door or other salient location.

Signposts 20 can operate on AC power 24 or on battery power 26, or both. Signposts 20 can operate completely independently or while communicating to a remote controller 12 system by wire, LAN, WI-FI, Internet, power line carrier, radio, IR or other means, and have the capability, although not necessarily all in one system, to handle the following exemplary access control, security, and environmental inputs and outputs.

Access control inputs may include inputs such as proximity, metal, weight, drive over, door, gate, light, IR, handle, access code, card, key, or tag, eye pattern, fingerprint, voice and/or video camera, sensors, readers or detectors, and outputs to operate items such as doors, gates, signs, lights, and/or indicators. Security inputs may include inputs such as hazardous material, radiation, drug, and tamper sensors, readers or detectors, and outputs, such as alarms, warning lights, displays, restraints and/or remote notification. Environmental inputs may include inputs such as temperature, water, light, power, moisture, voltage and pressure sensors, readers and detectors, and outputs, such as heaters, coolers, motors, pumps, fans, and/or lights.

In addition, time inputs or internal time and date-keeping capability may be maintained independently or synchronized or set by system controller 12, clock or by radio synchronized time input, in order to maintain access control or other functions that vary with time, such as when a facility is closed, for security and other purposes, or a time-and-date stamp for sending to a tag 18 for recording and/or radio communication.

In a system having direct communication between each signposts 20, or the signposts 20 and the system controller 12, or those having a self-contained time generator that is synchronized by time broadcasts, common resets or other means, the system can prevent collision between signpost IR transmissions by time-division multiplexing with each signpost 20 transmitting at different times in a cyclical fashion where a first signpost transmits at time T1, a second signpost transmit at time T2 etc., or the transmissions can be interleaved in a manner based on a priority method, however, the cyclical operation can also be augmented by having a priority system where one signpost 20 can interrupt or override other signpost transmissions.

If the control system 12 detects a critical condition, such as a tag or signpost signal indicating a security breach, or it detects hazardous material, the system 12 can assign the appropriate signpost 20 a higher transmission priority, and, for example, send instructions to the signpost 20, or all signposts 20, to stop access and raise an alarm. The system 12 can also receive or request a video or image of the signpost area, for security or a record of events.

In a system not having direct communication between each signpost 20, or the signposts 20 and the system controller 12, and does not have a self-contained time generator or time base, there may be situations, such as when signposts 20 are in separate rooms, where collisions of the signpost signals will not occur.

However, whether such collisions might or might not occur, a special pulse low-duty cycle method of asynchronous pulse communication may be used where an IR signpost signal and a radio tag signal can overlap, and continue to operate, with an occasional collision that can be detected and accounted for, and, if necessary, rejected, as disclosed in U.S. Pat. No. 6,611,556, which is incorporated herein by reference.

Alternatively or in addition to the pulse method of transmission, and without having absolute time base, an algorithm can program the signpost signal times to vary in a predetermined fashion so that each signpost 20 will eventually have a period where no other signpost 20 is transmitting.

A signpost 20, with a proximity sensor or detector, if activated, may send its signal to a tag 18 at an increased rate, and in a configuration having connection with the local control system 12, may contain, for example, a door access control output, that results in a item or person having access or entry only if they have an appropriate tag or badge, as determined by the local control system 12.

As such, the system addresses a low-cost IR augmentation mechanism for RFID beacon tags, which provides reliable local area, zone, chokepoint or room-by-room tag localization. Each room or portal region under localization may be fitted with one or more low-cost IR signpost transmitter units that can continuously beacon a location or address code. The signpost address or coordinates do not identify the signpost, but identify where the signpost is located. In this way, if the signpost is replaced in the same location, the transmitted address code remains the same. The address code can be programmed in the field to define its location or coordinates.

Figure 5:
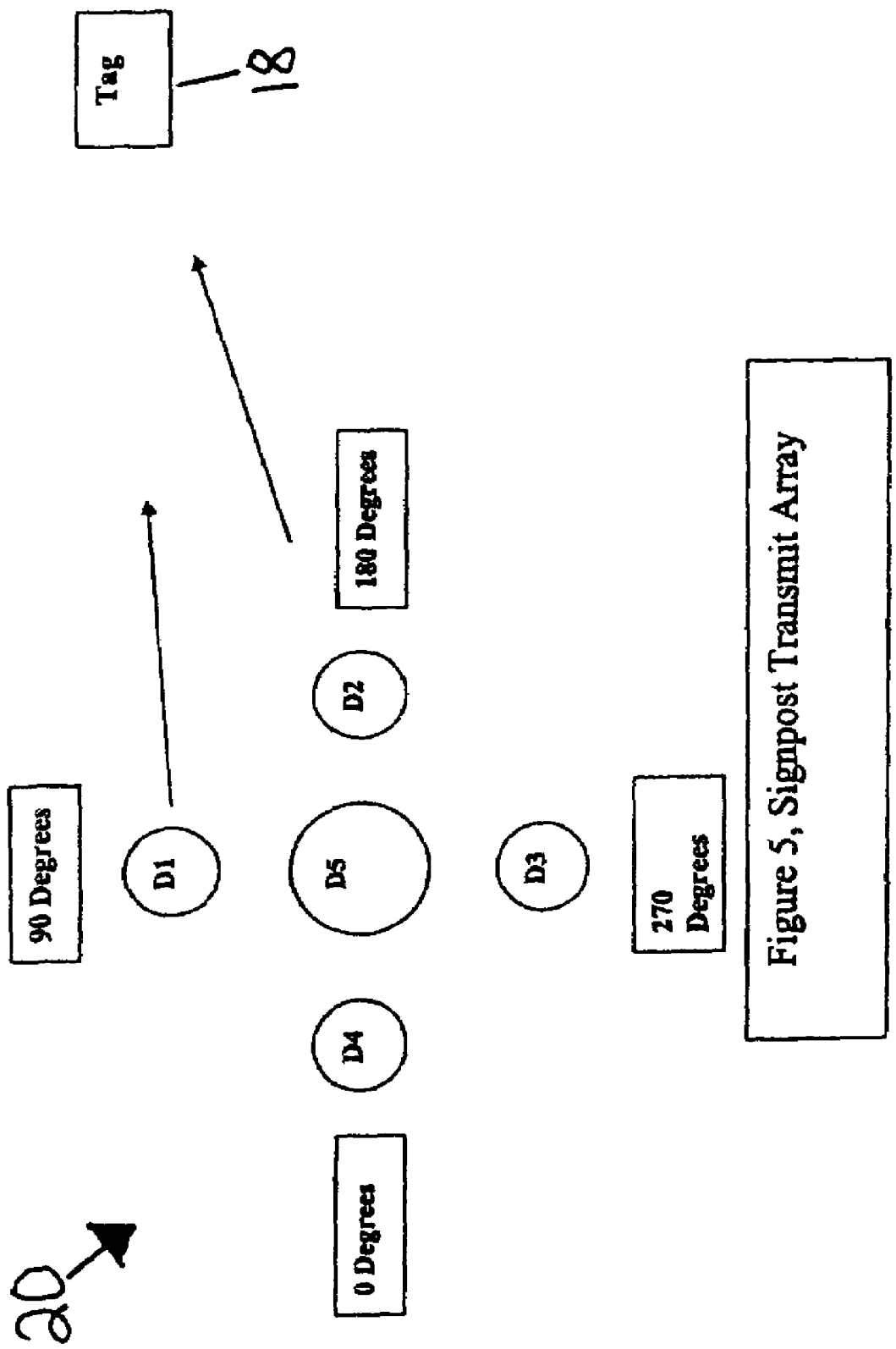
FIG. 5 is an exemplary signpost transmission array including IR transmitting diodes D1, D2, D3 and D4 that are in a circle around D5, in accordance with systems and methods consistent with the present invention.

An exemplary signpost transmit array is shown in FIG. 5. The array comprises a simplified example embodiment of an array of four transmit diodes (D1-D4) in a circle located 90-degrees apart from each other, and one (D5) in the center. Higher positional resolution can be achieved with more diodes, such as 8 diodes, each located 45 degrees apart from each other, or even more diodes. Each of the outer diodes (D1-D4) may be generally pointed in a direction away from where diode (D5) is located, so when activated in time sequence, they (D1-D4) create a scanning pattern of IR radiation similar to a flash light pointing and rotating in directions of 0, 90, 180 and 270 degrees. If mounted on a ceiling, the diodes (D1-D5) may all face down and the diodes in the outer circle (D1-D4) may face down angularly towards the floor, to point towards tags 18. It also may be desirable to use lens and/or shielding, to obtain the desired width and relative spacing of the IR radiation patterns.

The purpose of this configuration, instead of using just one center diode (D5) that radiates IR omni-directionally, is to provide the ability to locate a tag 18 within a portion or a segment of the proximity area of the signpost 20, and is understood best by explaining its operation. A proximity area of a signpost is the entire area in which a signpost IR transmission is readily detectable by a tag.

The signpost 20 first outputs an omni-directional output by activating diode D5, and transmitting the signpost ID and other associated information, including control data that indicates that a sequential multiple read-cycle will follow. This wakes up the tag 18 and synchronizes it (or many tags 18) for reading additional data that follows, where diode D5 is turned off and diode D1 is activated followed in a time sequence by D2, D3 and D4. The tag 18 knows what the activated diode is by its time of transmission and arrival. Alternatively, the signal transmission of each diode can result in a code indicating its specific identity, operation or direction.

In the example shown, the tag 18 is located in the upper right corner of FIG. 5 and receives the input from diode D5 since it radiates omni-directionally. Since the tag 18 is closest in angle to D2 it receives the most intense signal from D2, and less signal from D1, and little or no signal from D3 and D4, as they are pointing in the opposite direction of tag 18. In a most simple system, the tag 18, as it is moved around, would "see" only the IR outer ring diodes shining directly towards it.

However, if the tag 18 was equipped with an IR receiver with a signal-strength-indicator (SSI), the tag 18 could "see" each diode (D1-D4) as it was read in the time sequence, the relative diode signal strength indicating tag localization. If the tag 18 was located directly between two diodes, the tag 18 would receive approximately equal, but reduced outputs from the two diodes, indicating that the tag 18 was centered between the diodes. As the tag 18 is moved in an angular position around the center of the array, one of the closest diode amplitudes goes down, as another goes up, indicating that the tag is moving toward the later and away from the former.

If the outer diodes (D1-D4) are read by the tag 18 ratiometrically, the difference of their received amplitudes divided by their sums, centering a tag 18 between two diodes will create a zero output, and when the tag 18 is moved in one direction the ratio is positive and goes up in amplitude, and when moved in the other direction, is negative and goes down in amplitude. It can be seen that the angular position of the tag 18 can be resolved to a much higher resolution than indicated by the number of diodes, however, as a practical matter, the use of SSI makes the tag circuitry more complex, as it is generally not a feature of low-cost TV-type IR receiver chips or modules.

However, many other practical issues also make it difficult for such a simple system to operate effectively. For example, if the outer ring diodes (D1-D4) are transmitting at very high levels, sufficient IR may bounce or reflect around the room and cause false reads, the angular IR output of the diodes may overlap or be insufficient to cover the entire 360 degree range, and if the tag 18 is moved directly under the diodes, the ability to resolve angular position will decrease the closer the tag 18 gets to the diodes (D1-D4).

Therefore, a practical system generally needs more diodes, generally 8 or more in the outer circle, to provide an overlap of coverage, and to provide adequate determination of the angular location to a reasonable resolution. The diode transmission amplitudes need to be sufficient to reach or be in range of the tag 18, but not be in excess, and it may be necessary to put multiple diode arrays in a room. For example, four diode arrays can be put into a room, with one in each corner, and the diodes that point towards the walls can be made inactive, blocked or removed. The four diode arrays can be operated with one master signpost 20 and a number of slave signposts 20, or one signpost 20 can drive a number of remote diode arrays.

In this case, the position of the tag 18 can be better determined from the four arrays, particularly when the tag 18 is moved through the room, as it should always be in range of one of the four arrays, and if in the center of the room, read approximately equally by all four arrays. In addition, instead of using SSI in the tag 18 to measure the signal strength, a tag 18 having a fixed level of signal sensitivity can be used, in conjunction with signpost transmit signals that can be varied in amplitude.

The same sequence of reading the outer diodes, D1, D2, D3 and D4 may be used, however, multiple read cycles may be sent with each read cycle having a different amplitude. This may be accomplished, in an exemplary embodiment, by having a programmable current source drive an array of diodes, so that the diode current levels are programmed as the diodes are activated in time sequence, or by the use of different diodes having different output levels. In this manner, the read cycles having only one diode read will be the diode closest to the tag 18. By having a profile of reads at different amplitudes, one can determine roughly where the tag 18 is between two-array diodes.

For example, assume that the array of diodes (D1-D4) are sequentially stepped through eight amplitude levels, highest (level 1) to lowest (level 8). Assume at level 5, diodes D1, D2 and D3 are detected and read, then at the next lower level amplitude level of 6, only diodes D1 and D2 are read, and then at level 7, only diode D2 is read. This sequence indicates that the tag 18 is closest in direction to diode 2 and closer to diode 1 than to diode 3. It can be seen that as few as two diodes can be used to determine position on either side of a choke point, such as a door, and it can be determined what direction the tag 18 is going through the door.

It should be understood and appreciated that the pattern of diodes may vary substantially. For example, instead of a whole circle of diodes, only diodes representing two directions or a reduced angle of direction may be used or activated. In addition, instead of IR, visual light from a diode or laser may be used, with tags 18 having receivers sensitive to visual or laser light, or the signpost 20 and tags 18 may use, in combination, visual light, laser light and IR, or some other combination. This has the advantage that IR can be used to broadly flood an area to activate tags 18 that are not in direct line-of-sight with the signpost diodes, and visual or laser light can be used to locate the tags 18 within an area with more of a directed, targeted or line-if-sight operation, for increased position resolution.

Figure 4:
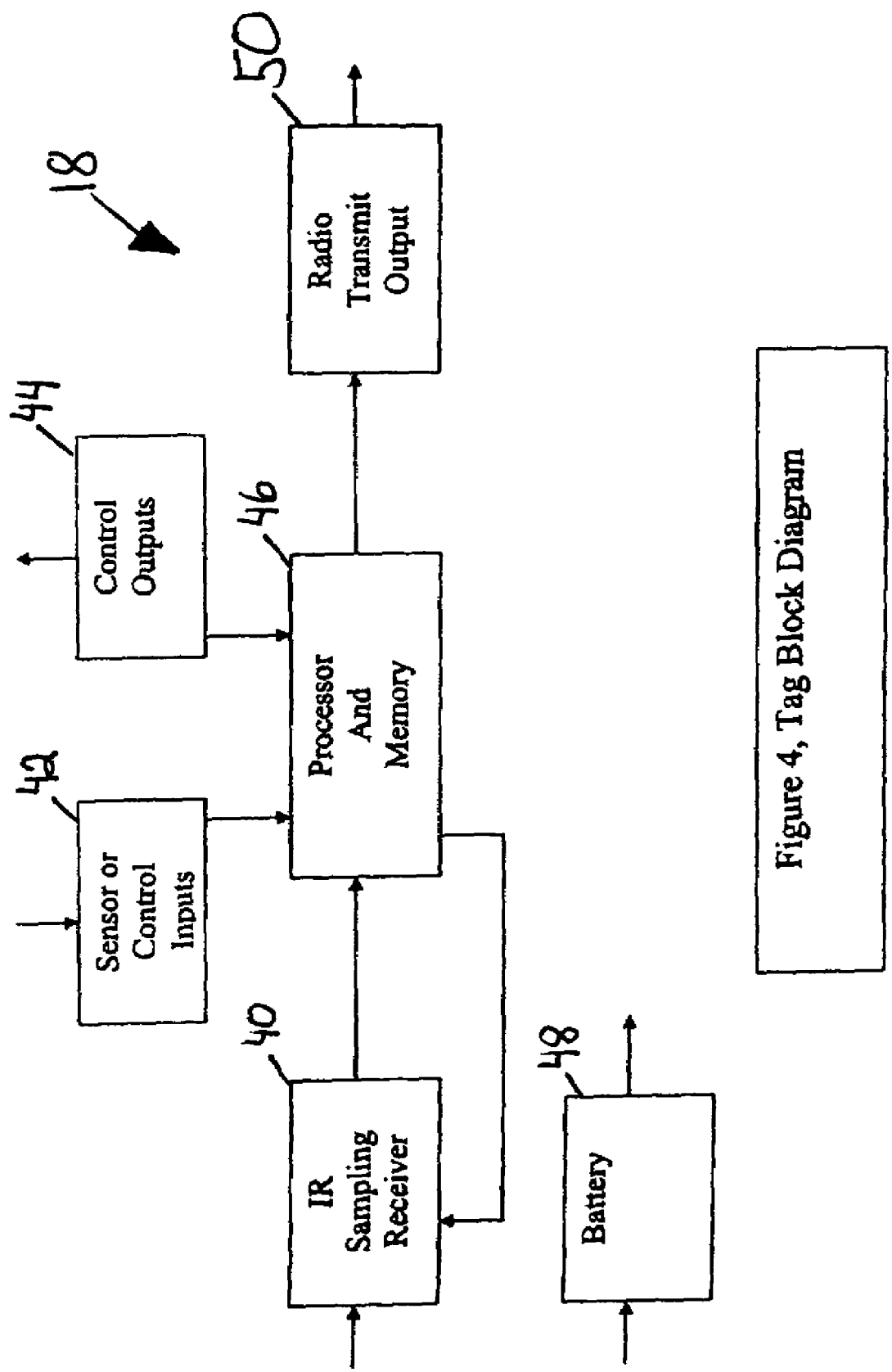
FIG. 4 is a block diagram of an exemplary tag including an IR receiver, sensor or control inputs, control outputs, a controller having a processor and memory, a battery and a radio transmit output, in accordance with systems and methods consistent with the present invention.

A tag 18, as shown in FIG. 4, may include an IR receiver 40, sensor or control inputs 42, such as a motion sensor, control outputs 44, such as a light indicator, a controller 46 having a processor and memory, a battery 48, and a radio transmit output 50. An exemplary tag embodiment may use RF for the radio transmit output, although the transmit output could also be IR, acoustic, or a combination thereof.

Tags 18 within proximity or range of the IR signpost transmitter 38 detect the infrared signal, and relay the location code along with its own tag ID code and associated data to RFID receivers units 22, which are local or more centrally and widely distributed within a desired area. The RFID receivers units 22 are, in turn, networked and interconnected with one or more system controllers 12 and one or more host computers 15. In an indoor application, the infrared signal does not penetrate walls, ceilings and flooring, so an effective localization capability is achieved without overlap or interference.

The tag output signal does not have to be analyzed for positioning since the tag output signal is the mechanism for communicating the signpost localization information. If operating at a typical 300 to 900 MHz, a great deal of overlap can be provided to insure reception, however, the signal reception is not in itself needed to be used for local or fine positioning. This is a significant issue when the problems of signal reflections and other issues of operating in a complex environment are understood.

Tags 18 can employ encrypted IR data input, and or RF output, in order to prevent tampering or access of secure tag data or information. This can be accomplished by the local system controller 12, or a global controller, using a key to encrypt and to create unencrypted data sent to or received from a signpost 20 or tag 18. However, the encoding of signals to transmit them and the decoding of signals to receive them should not to be confused with encryption for security purposes.

Tag capabilities, in summary, may include dual antenna outputs for diversity of antenna patterns for improved range and constancy of performance; extended battery life because of lower beacon duty cycles that speed up with signpost input; extended battery life with lower beacon duty cycles that speed up with motion detection, general locating capability as determined by which receivers 22 are receiving tag signals; local position input from a signpost 20 that is then transmitted to a receiver 22; tag beacon operation and/or signpost instituted transmission, or both; encoded bits for collision management; sensor inputs, such as motion detector, tamper switch, moisture, tilt, radiation detectors etc.; control outputs, such as a visual or acoustic indicator; dual modes of operation with asynchronous and synchronous operation; IR receiver signal sampling to reduce tag current; and pulse communication for high peak RF communication signals levels.

Having such accurate real-time asset and personnel localization information can greatly enhance productivity and asset utilization.

Regarding the issue of signpost high power IR illumination, in typical consumer TV channel-changer applications, the IR diode is driven at approximately 20 milliamps. That amount of drive current provides a satisfactory operation when the IR LED is aimed directly at the receiver module. In the tag locating problem, in general, one may not have the luxury of direct alignment of the transmitting IR LED (with approximately a 20° beam width) and the IR receiver module (with approximately a 30° beam width). It is practical, however, to make a signpost IR transmitter, which is enormously brighter and thereby capable of activating the tag's IR receiver module, even when the IR beam should traverse multiple diffuse reflections from wall, ceiling, floor, furniture etc.

Such a high-powered IR transmitter has been constructed for experiments. The design utilized four banks of 3 LEDs (i.e. 3, 6, 9, or 12 LEDs can be active for testing). Since the IR LEDs may be used at low duty cycle, they can be powered at high current levels; a test circuit can be operated to drive the LEDs with 650 milliamps for 3, 6, 9, or 12 LEDs. Consequently, the IR illumination using 12 LEDs is roughly 350 times greater than a typical television channel-changer. This is actually quite practical using a conventional wall power outlet, because the circuitry is simple and the components are inexpensive. The IR LEDs that were used (the Everlight IR 204-A LEDs) cost only six cents each.

The proto-type signpost 20 may be powered by a lead-acid battery to facilitate untethered experimentation in different positions and locations. It was used in conjunction with a portable IR receiver module test circuit, which was powered by a 3 V lithium battery (simulating a tag 18). The signpost 20 was controlled by an MSP430-microcontroller (available from Texas Instruments) programmed to issue a blink of simulated IR location data every second. The signpost 20 transmitted omnidirectionally with 12 LEDs in the LED bank. At the receiver, detection of the IR data blink was indicated by a visible light LED.

The resulting coverage performance with the high-powered transmitter was quite satisfactory. The tag receiver was noted to respond to the IR bursts in any position and orientation of the tag receiver unit or any orientation of the IR transmitter. Satisfactory operation was observed when the simulated tag 18 was placed deep in a shelf or backed tightly against a wall or even under a table. Satisfactory operation was also observed through multiple layers of textile and through portions of the human body, such as the hand or forearm.

A simple and effective strategy was found to be to direct the IR LEDs towards the ceiling providing diffuse illumination throughout the room, although any aiming direction was acceptable. This was effective in smaller rooms or in a large room of 20' by 40' dimensions. The only circumstance which precluded IR coupling was when the tag receiver was placed in a substantially light tight container, a closed cupboard or a closed drawer.

Regarding the tag IR receiver, for simplicity and lower cost, the tag IR receiver can utilize existing consumer electronic components for IR signaling to television sets, stereo receivers, DVD decks, etc. These types of products typically employ an integrated IR receiver module that comprises sensitive detection electronics, as well as an IR receiver diode in one component package.

The associated electronics perform several functions: they detect modulated in-band IR by means of a bandpass filter; they provide automatic gain control and level adaptation, as well as low-level signal detection. This type of functionality is desirable for operation over a significant distance, particularly when there is lighting and other IR sources in the environment. These modules have evolved in design over many years and are made in large volumes and at low cost.

Manufacturers in the IR receiver module business include Sharp Electronics and Vishay Semiconductor, though tag 18 may utilize any conventional IR receiver module. In some respects, such IR receiver modules may not be ideally suited for application in RFID tags 18. Most of these product offerings are intended for 5 V operation and will not work on a 3 V battery. The majority are also leaded components which add board space and assembly cost to a small RFID tag 18. Most also consume several milliamps of current.

So far, the preferred IR receiver module appears to be a Sharp offering in a leaded package, sold under part no. GP1UW700QS, which operates down to 2.4 V at 500 microamperes. Although 500 microamperes is low, compared to the majority of available receiver modules, it is still large for a tag having a typical average current budget of 2 microamps. Thus, the receiver module should be powered only for brief periods on a low duty cycle.

It may be possible to design a custom IR receiver chip, which would be more optimally suited to this problem. Such a custom IR receiver chip would optimally provide a smaller circuit board footprint, lower operating voltage and ultralow current consumption.

Experimentation was also conducted with direct sunlight shining on the tag IR receiver module. In this circumstance, the tag IR receiver module worked less effectively. It was observed that when sunlight falls within the main beam of the IR receiver module, there is no operation. When sunlight is off axis, operation occurs only when the IR transmitter is relatively close to the IR receiver module. Operation will therefore likely be predominantly limited to indoor or covered applications. For example, truck loading dock application scenario could be contemplated, only if it were substantially shrouded from direct sun. Alternatively, a truck loading dock application could be well served by a portable signpost transmitter, which is temporarily placed within the body of the truck thus using the truck itself as a shroud for sunlight.

Regarding the issue of waveform design and tag battery life, constraints inherent to the tag's IR receiver module impact battery life. Similarly, message waveform duration impacts battery life.

Experiments suggest that the IR receiver module should be powered-up for at least 2 ms prior to receiving IR signals, in order to detect signal bursts with full sensitivity. In some cases, detection will occur within 1 ms of power up, but with reduced sensitivity. The battery charge consumption for a minimal power up interval is 2 ms×500 uA=1 uC. In comparison, the battery consumption associated with a single RF beaconing event with an RF Code tag is approximately 3 uC for a US tag version (RF Code tag no. 05102050-52 was used). Thus, when an IR read attempt occurs immediately preceding each beacon event and no IR signal is detected, the additional consumption imposed on the battery is 33%, which can be reasonably tolerated.

However, if an IR signal is present during a 2 ms sample period and the tag 18 proceeds to read the IR signal data, then the tag 18 would need to extend the receiver module on-time to first complete the message in progress, then detect a fresh start pulse and a complete identification message from the transmitter. So, on average, the on-time for the tag's IR receiver module would need to be 2 ms, plus 150% of a single complete transmission.

The proposed message duration may be calculated as follows. Experimental observations have shown that approximately 11 IR modulation pulses are desired, per burst, for good pulse sensitivity at the tag's IR receiver module. Using 36 kHz modulation, an eleven pulse burst takes 305.55 µs. Conversely, 10 cycles of the watch crystal frequency, 32.768 kHz, takes 305.18 µs. Thus, 11 cycles of modulation is numerically convenient since data clocking from a 36.000 kHz signpost crystal will agree to within 0.12% with the tag sampling process, which is clocked using a low-cost commodity 32.768 kHz crystal.

In order to operate the signpost's IR LEDs, such as the one or more LEDs that may represent diode D5 in FIG. 5 at high-pulse current, the LED duty cycle should be proportionately reduced from their nominal 100 mA continuous current specification. However, a code employing high-duty cycle is necessarily spread in time, which has negative implications with respect to IR collisions and a negative impact on tag battery consumption during a read cycle. An additional factor favoring operation at low duty cycle is that the tag's IR receiver module adaptation function performs better—lower duty cycle will give better sensitivity.

A desirable solution is to use two-bit pulse position modulation coding for the IR transmission signals from the signpost 20. By that strategy, exactly 1 pulse will be transmitted in each successive group of four times slots. This results in an allowable pulse current of 400 mA—nearly as aggressive as the 650 mA used in the experimental signpost simulator. Thus, the time interval required per bit is 2×11=22 modulation periods.

For IR transmission signals from the signpost 20, a message comprising 11 bits of message value, five bits of preamble and eight bits of checksum—24 bits—may be used. In addition, there should be a message gap and a start bit; that can be approximated as 2 additional bits or 26 total. So, the overall time duration of the contemplated message is 26×22=572 modulation periods. Employing 36 kHz modulation, that computes to about 16 ms.

So the average required on-time for the tag's IR receiver module is 2 ms, plus 150% of 16 ms=26 ms to receive an IR location message with checksum and header. The battery cost is therefore 26 ms×500 uA=13 uC.

For the purpose of battery life analysis, it is sensible to consider the case of several baseline tag configurations wherein the tag 18 spends its entire life in the presence of an IR signpost 20. For the baseline configuration, it is presumed that a single IR read occurs prior to every RF beacon occurrence. The table below provides a comparison of battery life for an MSP430 microcontroller-based US tag with and without baseline IR signpost functionality and based on the waveform parameters here contemplated. For simplicity, this table does not incorporate a battery end-of-life performance factor or self-discharge model. The table is based upon a linear battery life of 22 microampere-years (CR2032, a battery part no. available from Maxell Corp.) and presumes a forward diode drop on MSP430 Vdd pin for 1.0 µA continuous consumption by the microcontroller.

Battery Life Calculation (Years)
(1 Battery/2 Batteries)

|  | RF only Tag (not being activated by a signpost) | Signpost Tag (activated by a signpost) |
|---|---|---|
| 30 sec beacon | 20/40 | 15/30 |
| 10 sec beacon | 17/34 | 9/18 |
| 3 sec beacon | 11/22 | 4/8 |
| 1 sec beacon | 5.5/11 | 1.6/3.2 |
| 30 sec background + 15% motion at 1 sec | 14/28 | 6/12 |
| 30 sec background + 15% motion at .5 sec | 11/22 | 4/8 |

The IR read process has an impact on battery life, especially when shorter beacon intervals are required for better response time behavior. A technique is also disclosed which can significantly reduce current consumption while still providing fast IR reaction times. A benefit of this scheme is that the relatively expensive motion sensor component in tag 18 can be eliminated. There is presumed to be a need for a tag locating function when a person or asset quickly traverses a defined region of space inside a building. Thus, the duration of exposure to the IR signpost may be short.

One can assume that successive IR signpost portals can be spaced apart so that surrounding the portal there is a region with no IR transmission. This installation constraint may be required for reliable fast reaction at "portals." For room to room locating performance, there is no similar need for significant separation. In general, room to room locating capability and portal capability would not need to be located together.

Figure 6:
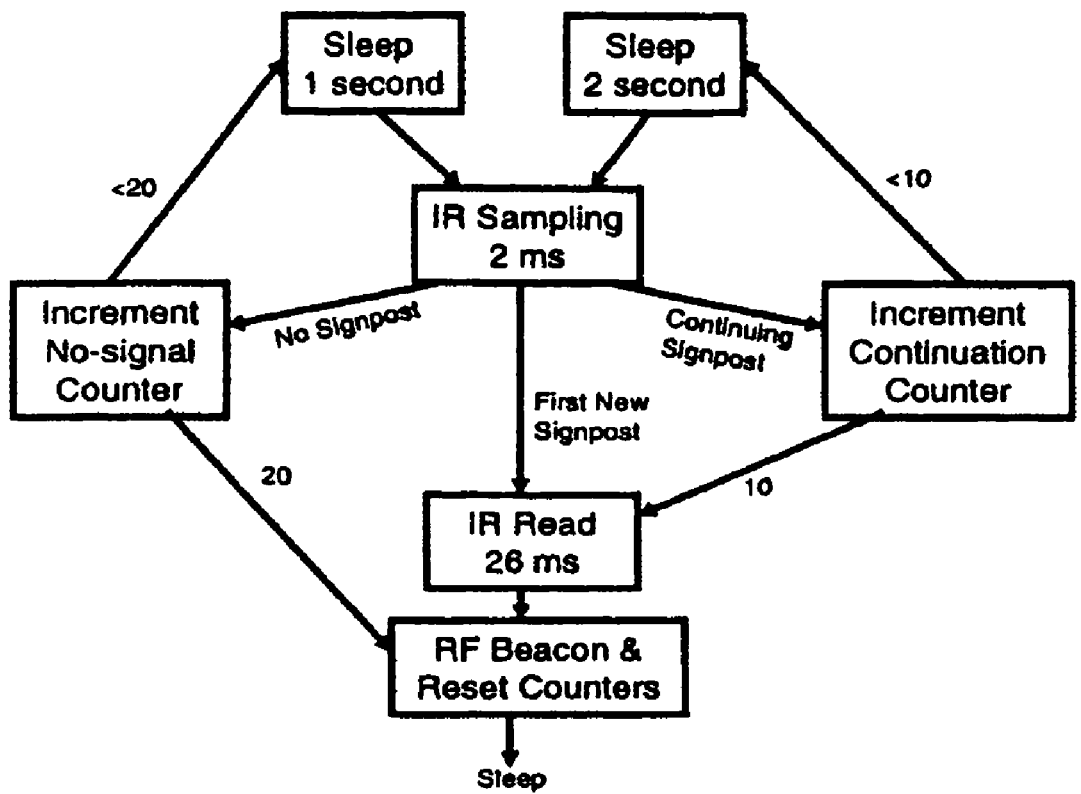
FIG. 6 is an exemplary block diagram depicting a non-motion tag strategy with variable beaconing, in accordance with systems and methods consistent with the present invention.

Referring to FIG. 6, one can consider a non-motion tag strategy with variable beaconing. The tag 18 may employ regular IR sampling at a one second interval, while no signpost signal is present or at a two second interval when a signpost signal is present. At each sample time, the tag 18 turns on its IR receiver for 2 ms looking for an IR signpost signal. If a signpost signal is not present, the tag 18 increments a counter. If that counter is less than a predefined limit, e.g., 20, the tag 18 goes back to sleep. At the 20th successive occurrence of no signal, an RF beacon report will be transmitted. At a sampling occasion, when a new signpost signal is first detected (i.e. when no signal was detected on the previous sample), the tag 18 initiates an IR read cycle and immediately generates an RF transmission including the new signpost location code. Conversely, when there is continuing successive signpost signals, the tag 18 increments a continuation counter. If the continuation count is less than a predefined limit, e.g., 10, the tag 18 goes back to sleep on a two-second cycle. Otherwise, on the 10th successive signpost detection, the tag 18 initiates an IR read cycle and an RF beacon cycle in succession. Under continuous signpost signal detection, the beacon cycle occurs every 20 seconds.

The net effect is that the tag 18 is responsive to a new signpost signal within one second as long as there was at least a single preceding sample with no signpost signal present. If a signpost signal is continuously absent or continuously present, the tag 18 reports on a 20-second beacon cycle.

Using the waveform assumptions, as before, one can calculate expected battery life for this strategy, as depicted in FIG. 6. The table below indicates battery life for a 20-second background beacon and for a 60-second background beacon. The table indicates battery life where a signpost signal is continuously present and where signpost signal is continuously absent.

Battery Life Using Variable Beaconing Strategy (Years)
(1 Battery/2 Batteries)

|  | Signpost Absent | Signpost Present |
|---|---|---|
| 60 sec background beacon; 1 sec IR response | 10.7/21 | 12.5/25 |
| 20 sec background beacon; 1 sec IR response | 10/20 | 10/20 |

The table above demonstrates that this arrangement results in substantially balanced battery consumption, whether the signpost signal is present or not. Ten-year battery life is achieved using a single cell in each case (albeit without accounting for battery dating or self-discharge).

Besides eliminating the need for an expensive motion sensor in the tag 18, the variable beaconing strategy has another advantage. Compared to a motion-sensor-based strategy, this technique greatly reduces the tag reporting density when assets are in motion. As a result, the potential for transient circumstances of very high pulse density and unmanageable RF collisions is substantially eliminated.

Another advantage to this approach is that it facilitates rapid communications startup with an IR programming fixture. An IR programming fixture will issue an IR attention signal for one second, followed by the programming messages as may be required. Because the tag 18 samples every second (with no signal present), one is assured that the tag 18 will catch the attention signal and the subsequent messages at the first instance of transmission. To accomplish fast startup by a motion-sensor strategy, tags 18 would need to be shaken while programming. This would be awkward and less reliable.

Typically, a tag 18 will always transmit its last known signpost location report. Even after the tag 18 leaves the field of the signpost 20, the tag 18 will continue to transmit the last known signpost position. A single bit in a tag message format may be used to indicate whether the signpost report is current or historical. This feature will assure that brief portal passages are reported at multiple beacon transmissions, so as to resolve the possibility of data loss due to RF collision occurrence.

Regarding the issue of compatibility with IR remote control devices, since the IR signpost 20 will typically operate at illumination levels generally greater than typical IR remote control units, there is a need for an anti-collision mechanism, so that the IR signpost 20 does not prevent operation of handheld remote controls. Even though handheld remote controls are usually operated by pointing the device directly at the receiving unit, that direct illumination may still not be sufficient to overcome the general diffuse illumination from the signpost 20 located in the same room.

The signpost IR transmissions are pulse position waveforms which operate at a duty cycle such that there are substantial off periods punctuated by pulse bursts of IR illumination. The signpost 20 will itself be fitted with one or more sensitive IR receivers. These receivers may be set for detection of the common pulse modulation frequencies that are associated with various consumer products, including television sets, stereo receivers, DVD decks and the like. This includes frequency use of 36 kHz, 38 kHz, 40 kHz, as well as some other frequencies that are less commonly used, if desired. The output state of these IR receivers will be monitored between every pulse burst of the IR signpost 20. At the first instant that signal is detected on one of these modulation channels, the IR signpost 20 will instantly cease operation for a desired interval, e.g., around five seconds. This quiet interval will allow the handheld remote control to complete its messaging to the consumer product of interest. In general, the waveform associated with these consumer products includes a significant start pulse interval and/or a repeating message which is transmitted two or three times. Thus, even though a collision is possible for the duration of one signpost pulse burst, while the signpost's IR receiver modules are blinded, that very brief initial collision will be of no import.

There is a practical and more general alternative to the use of separate receiver modules for every modulation frequency of interest (or concern). It is possible to employ digital signal processing technology to simultaneously detect multiple modulation frequencies from a single sensor. By this approach, a single photo diode could be utilized with an analog-to-digital converter, which is continuously sampling the illumination level at a regular frequency that is at least as great as two times the highest modulation frequency of interest. The output of the converter would feed a microcontroller or DSP chip, where appropriate algorithms may reside for detection of IR transmissions. Such algorithms are well known.

To facilitate reliable detection of the IR signal from a low-power handheld controller it is generally preferred to locate the signpost 20 in close proximity to the consumer product targeted by the controller. In this way, the IR signal which is pointed towards the consumer product and intended to activate it will also simultaneously activate the IR detector in the signpost 20.

It is possible that practical considerations regarding defining the IR coverage area of the signpost 20 in the room may dictate a mounting location for the signpost 20, which is not optimally close to the consumer product of interest. To accommodate that circumstance, a relay unit having a remote sensor may be utilized. The remote sensor may be coupled to the signpost 20 by dedicated wiring, power line signaling, radio link or an optical link, for example.

The use of such a remote sensor module may also be dictated under the circumstance of a room having multiple consumer products which are controlled by an IR controller and which are located at different positions in the room. In this circumstance, it may not be possible to locate a signpost 20 in close proximity to all of the consumer products.

Regarding the issue of system expansion, in order to a make the system expandable, with added functions and capabilities, it is desirable to have communication formats that can vary to meet a wide range of applications and are expandable as required. Stated simply, communication formats need to be as simple and short as possible, but need to be able to grow to add new capabilities and functions, even if all the future possibilities are not presently known.

This objective may be accomplished with formats that, for a particular application, allow you to pick and choose among existing features and functions, and yet be able to add new ones that are not presently defined. A first element in accomplishing this is to have a highly disciplined, comprehensive and planned communication format that has the built-in flexibility to change or expand. A second element is to maintain the standards over time, for example, if the status of the tag battery voltage is determined by an eight-bit data format, then the same standard should be used for all tags 18 for this purpose in all applications. A third element is to have a format that makes sure that the exemplary eight-bit data format that is the same in all applications, is defined or called out in the same fashion in all applications.

In these ways, the system software does not have to change when reading the same data for the same function or feature in all applications, as it can be programmed to match the selected variable of the tags 18 and other hardware. If the format is considered a key, then the same key may be used in the hardware and software so that everything works together. If something new is added then hardware may need to have expanded capability or be programmed to handle a new sensor or other variable. A new corresponding software module may need to be added to read and use the data. However, if one is going to read temperature on two tags 18 in two applications, using the same sensor, then the data format should remain the same, and the corresponding software module should remain the same.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A radio frequency identification (RFID) system, comprising: an RFID signpost; and a plurality of infrared transmitters; wherein each infrared transmitter of the plurality of infrared transmitters is arranged to cover, when transmitting, a distinct sector relative to the RFID signpost.

2. The RFID system of claim 1 further including one or more RFID tags.

3. The RFID system of claim 2 wherein each of the one or more RFID tags includes an infrared receiver.

4. The RFID system of claim 1 further including one or more additional RFID signposts, each of the one or more additional RFID signposts having a plurality of infrared transmitters wherein each infrared transmitter of the plurality of infrared transmitters is arranged to cover, when transmitting, a distinct sector relative to a respective one of the one or more additional RFID signposts.

5. The RFID system of claim 2 wherein each infrared transmitter of the plurality of infrared transmitters alters the amplitude of signal transmission in a predefined manner to enable a determination to be made as to the position of the one or more RFID tags relative to the RFID signpost.

6. The RFID system of claim 5 wherein the predefined manner comprises one of increasing or decreasing the amplitude of signal transmission sequentially.

* * * * *